June 22, 1965    B. S. PAULSON ET AL    3,190,062
ROTOR FOR MECHANICAL BEAN PICKER
Filed April 6, 1964

INVENTOR.
BERNARD S. PAULSON
BRUCE H. PAULSON
BY
Merchant, Merchant & Gould
ATTORNEYS United States Patent Office 3,190,062
Patented June 22, 1965

3,190,062
ROTOR FOR MECHANICAL BEAN PICKER
Bernard S. Paulson and Bruce H. Paulson, Clayton, Wis., assignors, by mesne assignments, to Pixall Corporation, Clear Lake, Wis., a corporation of Wisconsin
Filed Apr. 6, 1964, Ser. No. 357,682
7 Claims. (Cl. 56—130)

This invention pertains to mechanical devices for harvesting crops, such as beans and the like, planted in rows and, more particularly, pertains to an improved gathering or picker rotor structure for such mechanical devices.

Mechanical harvesting devices of this type generally comprise a pair of gathering rotors mounted for rotation in a frame member, the rotors being laterally spaced on opposite sides of the frame and parallel to each other, the axes of the rotors extending generally longitudinally of the direction of travel of the frame. The rotors further have a plurality of circumferentially and longitudinally spaced radially extending resilient picker tines. As the rotors are rotated, the tines move through the bean plants and strip the bean pods therefrom, the harvested pods being deposited on a conveyor or other suitable collection device. The axes of the rotors are generally tilted upwardly and forwardly of the direction of travel of the frame, so that as the rotors come in contact with the bean plant, the pods are stripped from the top of the plant first, the tines of the rotor working downward on the plant as the rotor moves past.

In prior art devices of this type, the longitudinal spacing between adjacent tines is the same, or in other words, the tines are equally spaced longitudinally along the length of the rotor. With rotors of this type, there has been a great tendency for the tines to break off portions of the plant and in many instances to uproot the entire plant. This results in clusters and unsatisfactory picking results.

In the present invention, on the other hand, the longitudinal spacing between the picker tines on the forward half of the rotor is greater than the longitudinal spacing between tines on the rearward half of the rotor. This arrangement allows the tines on the forward portion of the rotor, which come in contact with the plant first, to comb more easily through the plant thereby resulting in less initial damage to the plant. As the rotor moves past the plant, the tines start at the top of the plant at the front of the rotor and work down through the plant with the closer spaced tines at the rearward portion of the rotor doing the final stripping job.

It is one object of this invention, therefore, to provide a mechanical harvesting device having an improved rotor design.

Another object of this invention is to provide a harvesting rotor having a plurality of circumferentially and longitudinally spaced, radially extending resilient picker tines, the longitudinal spacing between the tines at the forward portion of the rotor being greater than the longitudinal spacing between tines at the rearward portion of the rotor.

These and other objects of this invention will become apparent to those skilled in the art upon consideration of the accompanying specification, claims, and drawings.

Referring to the drawings wherein like characters indicate like parts throughout the several views.

Figure 1:
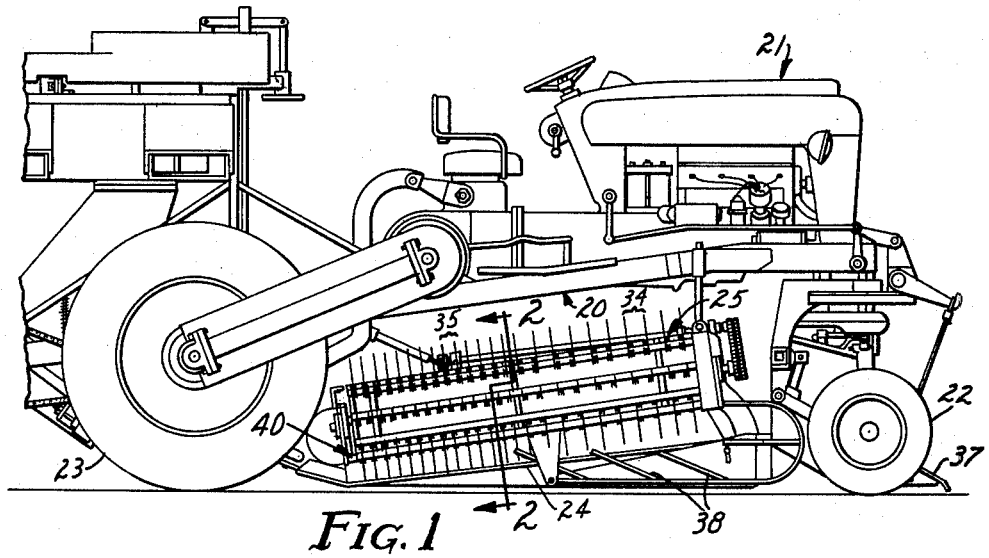
FIG. 1 is a side elevation of a mechanical picker utilizing the present invention, parts thereof being broken away.

Referring with greater particularity to the drawings, the numeral 20 indicates in its entirety an elongated frame having a tractor power mechanism 21 at its forward end. Frame 20 is supported by a pair of steering wheels 22 at the forward end thereof, and by a pair of laterally spaced drive wheels 23. Mounted on the frame 20 is an elongated horizontally extending guide plate 24 which slopes laterally outwardly and downwardly from the longitudinal direction of frame 20. A second guide plate (not shown) is mounted in a similar relationship on the opposite side of frame 20.

Figure 4:
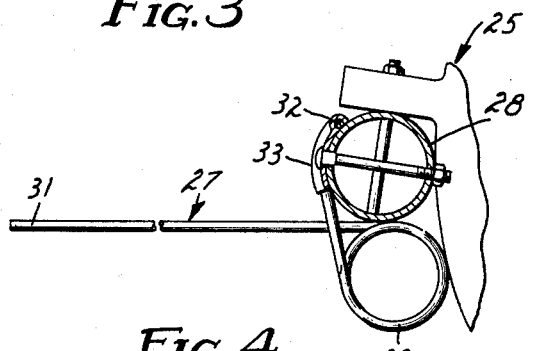
FIG. 4 is an enlarged sectional view taken along the line 4—4 of FIG. 3.

A gathering rotor, identified in its entirety by the numeral 25, is mounted for rotation in the frame 20 and is laterally spaced from frame 20 on an axis extending generally longitudinally of the direction of travel of the frame 20, the axis of rotor 25 being disposed laterally outwardly of the outer longitudinal edge of guide plate 24 and considerably above the level of the guide plate 24. The second gathering rotor (not shown) is mounted in substantially the same manner as rotor 25, on the opposite side of frame 20, the axis of the two rotors being generally parallel. The rotor 25 includes a plurality of circumferentially and longitudinally spaced radially extending resilient picker tines 27. The tines 27 are of conventional design and are adapted to be detachably secured to circumferentially spaced longitudinally extended bar-like mounting members 28 carried by rotor 25. As shown, particularly in FIG. 4, the tines 27 comprise coils 30 between their extended outer ends 31 and their inner ends 32. The inner ends 32 are clamped to the radially outer portions of the mounting members 28 by means of clamping bites 33. The longitudinal spacing 34 between the tines 27 mounted on substantially the forward half of rotor 25 is greater than the longitudinal spacing 35 between tines 27 mounted on the rearward half of rotor 25. The rotor 25 is rotated by means of a suitable drive chain on the forward end on rotor 25 driven by the internal combustion engine of tractor 21. While the drive wheels 23 are driven by suitable driving mechanism connected to the internal combustion engine of tractor 21.

Figures 2, 3:
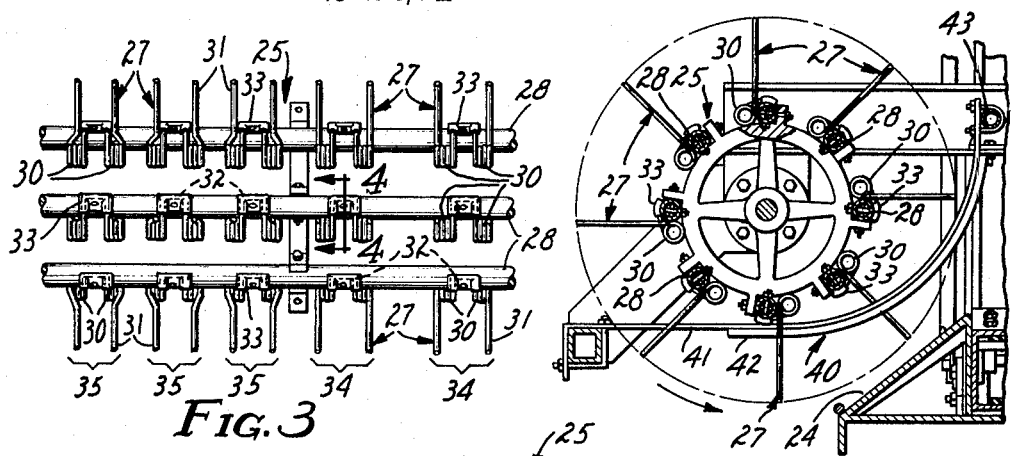
FIG. 2 is a sectional view as seen from a line 2—2 of FIG. 1, parts thereof being broken away.
FIG. 3 is a side elevation of the rotor of FIG. 2, parts thereof being removed.

As the tractor 21 and frame 20 are driven between spaced rows of beans (not shown), the rotor 25 and the rotor on the opposite side of frame 20 (not shown) will be positioned laterally outwardly of but above the planes of opposite rows. Rotary movement, in the direction of the arrow of FIG. 2, is imparted to the rotors 25 simultaneously with forward movement being imparted to frame 20. Initially, the plants are lifted and guided in an upright direction by guide elements 37, extending from the front of tractor 21, and by means of guide elements 38. While the plants are so retained, the resilient picker tines 27 of the rotors 25 pass upwardly and inwardly through the plants of the adjacent rows, and detach the bean pods from the plants, the detached bean pods being lifted or drawn upwardly into the delivery flight of a conveyor (not shown).

In prior art bean pickers, the tines of the gathering rotors are all substantially equally spaced, and in order to do an efficient job of detaching the bean pods from the plants, the tines were necessarily rather closely spaced so as not to miss a substantial number of bean pods. These relatively closely spaced tines tended to break the leaves and stems from the plants, and in many cases completely uproot the plant resulting in clusters of harvested material and unsatisfactory picking results.

With the rotor of the present invention, on the other hand, the tines at the forward end of the rotor are spaced further apart than are the tines at the rearward end of the rotor thereby providing a more gentle initial stripping action to the plants to remove a portion of the bean pods, the closely spaced tines at the rearward portion of the rotor doing the final stripping job and removing the remainder of the bean pods.

In many cases, the picked bean pods, or portions of the bean plant, will stick to the resilient tines 27, and it is necessary to provide some type of stripper mechanism for removing these pods and other material from the tines. Resilient stripper fingers, indicated in their entirety by numeral 40, are generally arcuate in shape and have a curvature of arc substantially the same as that described by the extended ends of the tines 27 on rotors 25. The stripper fingers 40 comprise a plurality of arcuate metal bands 41 mounted in laterally spaced apart parallel relationship and secured by the upper end of the arc to frame 20. A resilient strip, such as a rubber or plastic strip, 42 is mounted in longitudinal alignment with the metal band 41 and is rigidly attached thereto, the strip 42 being substantially wider than the band 41. The upper portion of the arcuate stripper fingers 40 are attached to a mounting bar 43 which in turn is attached to frame 20. The arcuate stripper fingers 40 curve downwardly and outwardly beneath rotors 25 and are longitudinally staggered with respect to the longitudinally spaced rows of resilient picker tines 27 so as to work therebetween. The spacing between adjacent resilient strips 42, bonded or attached to adjacent metal bands 41, is slightly larger than the diameter of the picker tines 27. It should be understood that the spacing between the stripper fingers 40 at the forward portion of rotors 25 will be substantially equal to the spacing 34 between the tines 27 at the forward portion of rotor 25 while the spacing between stripper fingers 40 mounted adjacent the rearward portion of rotor 25 will be substantially equal to the spacing 35 between the tines 27 on the rearward portion of the rotor 25.

As will be noted from the figures, the rotors 25 are mounted so that the axes thereof tilt rearwardly. With this arrangement, the flexible tines 27 engage the bean pods from the top of the vines or plants first, the tines working their way downwardly through the plants as the machine advances down the rows. If any of the beans, or parts of the bean plants or other material, stick to the resilient tines 27 of the rotors 25, this material will be removed from the tines 27 by the operation of the stripper fingers 40.

In the rotors shown in the figures, the spacing between the picker tines 27 at substantially the forward half of the rotor 25 is greater than the spacing between tines 27 of the rearward half of the rotor 25. However, it should be understood that the arrangement of spacing the picker tines 27 can be varied to suit particular needs. For example, the spacing between the tines 27 could be progressively varied as the tines 27 extend longitudinally along the rotor 25, or in another case, it may be desirable that the tines at the ends of the rotors be more closely spaced while the tines in substantially the center portion of the rotor be spaced a greater distance apart.

It is to be understood that while we have shown a specific embodiment of our invention that this is for the purpose of illustration only and that our invention is to be limited solely by the scope of the appended claims.

We claim as our invention:

1. A mechanical picker for beans and the like planted in rows comprising:
   (a) a mobile frame,
   (b) a pair of gathering rotors mounted for rotation in said frame in laterally spaced parallel relationship on axes extending generally longitudinally of the direction of travel of said frame, the axis of each rotor being disposed laterally outwardly of opposite longitudinal edges of said frame, said rotors including a plurality of circumferentially and longitudinally spaced radially extended resilient picker tines the outer ends of which are adapted to move upwardly and inwardly through the plants of adjacent rows to pick pods from said plants, the longitudinal spacing between said tines being greater at the forward end of said rotors than at the rearward end, and
   (c) a pair of longitudinally extended rows of resilient stripper fingers carried by said frame, one each adjacent a different one of said rotors, said stripper fingers working between the tines of their respecitve rotor.

2. A mechanical picker for beans and the like planted in rows comprising:
   (a) a rotatably mounted gathering rotor having a plurality of circumferentially and longitudinally spaced radially extended resilient picker tines, the outer ends of which are adapted to move laterally and upwardly through the plants to pick pods from said plants, the longitudial spacing between said tines being greater at one end of said rotor than at the other end, and
   (b) a longitudinally extended row of resilient stripper fingers mounted adjacent said rotor, the spacing between said fingers being such that said fingers work between the tines of said rotor.

3. Apparatus as described in claim 1 wherein the axes of said rotors are tilted upwardly and forwardly with respect to the longitudinal axis of said frame.

4. A mechanical picker for beans and the like planted in rows comprising:
   (a) a rotatably mounted gathering rotor having a plurality of circumferentially and longitudinally spaced radially extended resilient picker tines the outer ends of which move laterally and upwardly through the plants to pick pods from the plants when said rotor is rotating, the longitudinal spacing of said tines on substantially one half of said rotor being greater than the longitudinal spacing of the tines on substantially the other half of said rotor, and
   (b) a longitudinally extended row of resilient stripper fingers being arcuate and having a curvature of arc substantially the same as that described by the extended ends of the tines, the longitudinal spacing of the stripper fingers adjacent said one half of the rotor being substantially equal to the spacing of the tines on said one half of the rotor and the longitudinal spacing of the stripper fingers adjacent said other half of the rotor being substantially equal to the spacing of the tines on said other half of the rotor, said stripper fingers working between the tines of the rotor.

5. A mechanical picker for beans and the like planted in rows comprising:
   (a) a rotatably mounted gathering rotor having a plurality of circumferentially and longitudinally spaced radially extended picker tines the outer ends of which move laterally and upwardly through the plants to pick pods from the plants when said rotor is rotating, the longitudinal spacing between tines on portions of said rotor being greater than the longitudinal spacing between tines on other portions of said rotor, and
   (b) a longitudinally extended row of stripper fingers mounted adjacent said rotor, the longitudinal spacing between said stripper fingers being substantially equal to the spacing between corresponding tines on said rotor, said stripper fingers working between the tines of said rotor.

6. A mechanical picker for beans and the like planted in rows comprising a rotatably mounted gathering rotor having a plurality of circumferentially and longitudinally spaced radially extended resilient picker tines, the outer ends of which are adapted to move laterally and upwardly through the plants to pick pods from said plants, the longitudinal spacing between said tines being greater at one end of said rotor than at the other end.

7. A mechanical picker for beans and the like planted in rows comprising a rotatably mounted gathering rotor having a plurality of circumferentially and longitudinally spaced radially extended resilient picker tines the outer ends of which move laterally and upwardly through the plants to pick pods from the plants when said rotor is rotating, the longitudinal spacing of said tines on substantially one half of said rotor being greater than the longitudinal spacing of the tines on substantially the other half of said rotor.

References Cited by the Examiner

UNITED STATES PATENTS

| | | | |
|---|---|---|---|
| 1,555,695 | 9/55 | Novak | 56—130 |
| 3,142,949 | 8/64 | Carlson | 56—19 X |

ANTONIO F. GUIDA, *Acting Primary Examiner.*

RUSSELL R. KINSEY, *Examiner.*